United States Patent [19]
Gutierrez Rubio

[11] Patent Number: 4,777,872
[45] Date of Patent: * Oct. 18, 1988

[54] FRUIT SLICING MACHINE

[75] Inventor: Joaquin Gutierrez Rubio, Seville, Spain

[73] Assignee: Sociedad Anonima de Racionalizacion y Mecanizacion, Seville, Spain

[*] Notice: The portion of the term of this patent subsequent to Mar. 3, 2004 has been disclaimed.

[21] Appl. No.: 78,158

[22] Filed: Jul. 27, 1987

[30] Foreign Application Priority Data

Jan. 30, 1987 [ES] Spain .................................. 8700232

[51] Int. Cl.[4] ........................... A23N 3/00; A23N 4/08
[52] U.S. Cl. .................................. 99/538; 83/425.3; 83/435.2; 99/547
[58] Field of Search .................. 99/537, 538, 547–550, 99/552, 494; 83/425.2, 425.3, 435.2; 198/779, 387

[56] References Cited

U.S. PATENT DOCUMENTS

3,080,955  3/1963  Fennell .
3,688,826  9/1972  Amori .
3,915,082  10/1975  Rejsa et al. .
4,041,822  8/1977  Gabel .
4,646,632  3/1987  Gutierrez Rubio .

*Primary Examiner*—Timothy F. Simone
*Attorney, Agent, or Firm*—Cushman, Darby & Cushman

[57] ABSTRACT

A machine for slicing oblong fruit which have no pits, such as pitted olives, includes an inclined roller-type conveyor belt extending between an open-bottom hopper-type loading station to an interdigitated rotary knife-type of cutting station served by a comb-type of slice-unloading station. The hopper is open not only upwards and downwards, but also towards downstream, and the rollers are annularly corrugated and made to rotate towards the hopper immediately downstream of the hopper, so as to load the conveyor belt with a single-depth layer of fruit oriented long axis transversally of the conveyor. At the cutting station, the knives on the upper knife drum spike the fruit in a row and transfer those fruit from the conveyor into the nip between the upper and lower knife drums where the knives on both drums cooperate to slice the fruit. By preference, the knives are disk-shaped with regular patterns of small teeth regularly interrupted by individual larger teeth.

6 Claims, 5 Drawing Sheets

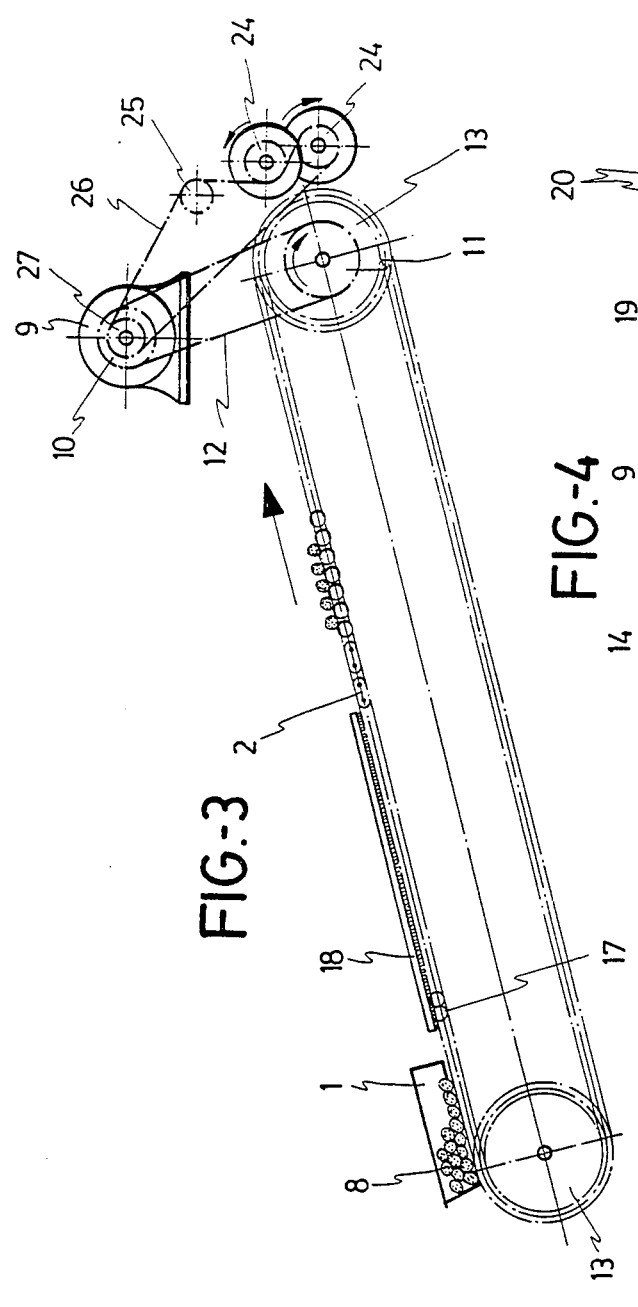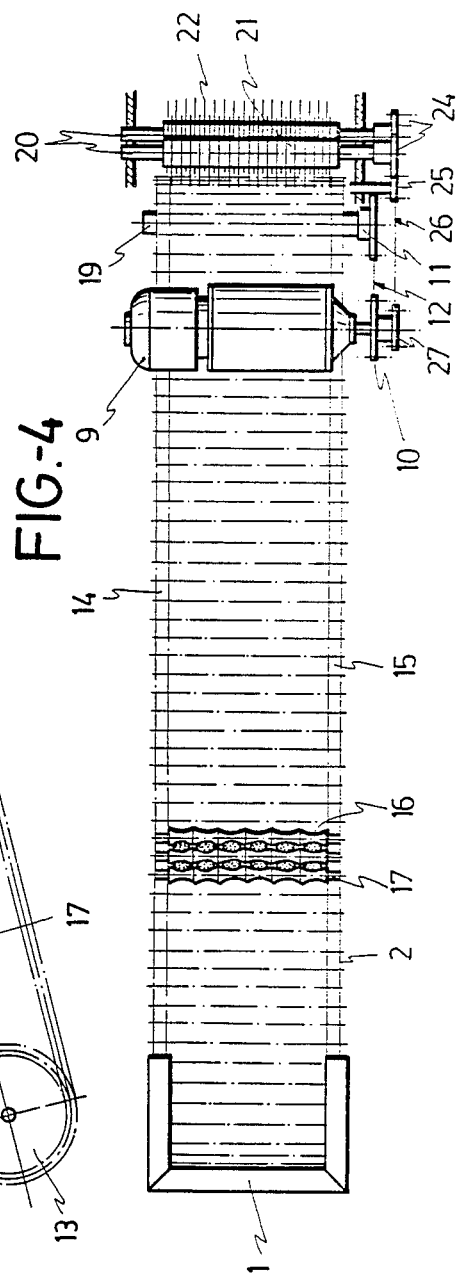

FRUIT SLICING MACHINE

BACKGROUND OF THE INVENTION (In the field of this invention, there is some lack of uniformity in terminology, with the term "pitted" sometimes being used to refer to fruit which has pits, and other times being used to refer to fruit from which pits have been removed. In the present text, the term "pitted" is used to refer to fruit from which pits have been removed, and the term "unpitted" is used to refer to fruit from which pits have not been removed. Pits are sometimes referred to herein as "stones".)

In my earlier U.S. Pat. No. 4,646,632, issued Mar. 3, 1987, I have disclosed a machine for slicing oblong fruits such as olives. In that machine, olives from which the pits have already been removed are deposited on the upward-sloping carrying run of an endless conveyor which is made of a succession of rollers mounted to chains entrained about sprockets. The rollers have flexible disk-like fins of progressively increasing and decreasing diameter from fin to fin so that the olives tend to settle into pockets and orient with their lengths crosswise of the belt as the rollers are rotated. The belt conveys the olives into a shaft of slicing disks. Olive slices are received between slicing disks and an assisting roller pushes in the remainder of any olive only partially sliced through, except that contact of the slicing disks with any pit still contained in an olive pushes that olive more deeply into a respective inter-roller pocket by flexing the respective roller fins. At separate locations along the conveyor, a comb pulls the olive slices out from between the slicing disks, and the pocket-entrapped pit-containing olives are dislodged.

In that prior machine, the olives move along the conveyor belt suitably positioned between respective adjacent twos of the rotating rollers (as shown in detail in its FIGS. 5 and 6). This is the most suitable position for cutting, for the rollers are provided with curved concave areas (likewise clearly visible in its FIG. 5), and this, together with the rotating movement of the rollers during displacement results in the transversal alignment of the longer axes of the olives.

In accordance with another of the features of that machine, the rollers are resilient and are furthermore provided with fins on their periphery, which fins define necks (i.e. grooves) for the access thereto of the periphery of the cutting knives.

Due to the resilient nature of the rollers, when a pit-containing olive is displaced along the conveyor belt, as shown in its FIG. 6, and reaches the working area of the cutting knives, the knives bear down on the olive and slice it partially, and, on coming up against the pit, exert a radial pressure on the olive which is as a result lodged in the converging dihedral defined between the rollers and the knives, as shown in its FIG. 7. The resilient nature of the rollers allows deformation thereof which, as shown in its FIG. 9, results in the total radial displacement of the pit-containing olive with respect to the periphery of the knives and, therefore, continued movement of the conveyor belt and continued rotation of the set of knives. The pit-containing olive passes the point of tangency between the conveyor belt and the knives, without cutting the pit, so that the considerable force on the knives which would result from cutting the pit does not occur, thus limiting wear on the knife blades.

The unpitted olive is prevented from being pushed in between the rollers due to the fact that a greater effort than is needed to slice the olive meat is required to deform the rollers, and therefore the rollers will not be deformed in the case of unpitted olives where cutting is very easy, but will be deformed only when the cutting knives come up against a pit, the greater resistance thereof giving rise to a larger radial force which results in deformation of the rollers due to the fact that their resiliency is overcome.

With the passage of time, more experience has been gained and I have come to realize that, although in basic concept the prior machine is an advance over what was previously available, it is itself subject to improvement. Accordingly, I set about to design and have invented improvements in such a fruit slicing machine. Some of the improvements are ones which might be expected any time a second generation of a machine is designed, and I describe hereinbelow some improvements of that type, but others are ones which I believe result in an overall machine which would not have been expected to result from a mere second generation redesign project.

In common with the machine of the prior patent, the present invention provides a machine for slicing olives and similarly round but at least slightly elongated fruit from nearly all of which pits are missing, for instance because pits originally present in the fruit have been removed in a previous de-pitting operation. The machines include an endless conveyor belt entrained about drive and return sprockets so as to define a generally upwardly-facing carrying run, and a return run. This conveyor belt includes endless chains entrained about the sprockets, and a series of transversally extending rollers mounted to the chains and each adapted to be rotated about its own longitudinal axis. Each roller includes a shaft having a succession of alternating annular protrusions and recesses which provide each each roller being provided with an undulating generatrix of alternatingly greater and lesser diameter along its length. The rollers are ranked along the endless conveyor belt so that a plurality of upwardly open fruit-receiving pockets is defined by corresponding lesser diameter regions of each two adjacent ones of the rollers. The lowness of amplitude of surface undulation and the proximity of adjacent rollers are sufficient to prevent fruits received in the pockets from falling through the carrying run of the endless conveyor belt. A fruit slicing station is juxtaposed with a relatively downstream region of the carrying run of the endless conveyor belt. The fruit slicing station includes transversely extending shafts having a series of disk-shaped fruit slicing knives mounted thereto with such radial extent and such close spacing between adjacent knives longitudinally of this shaft that as the rollers pass said fruit slicing station, each disk-shaped knife enters into a respective space between a respective two adjoining disks on the adjacent shaft and at least two disk-shaped knives intersect each respective pocket for cutting each respective unpitted fruit into at least three slices. A fruit supplying station is juxtaposed with the carrying run of the endless conveyor belt upstream of the fruit slicing station. At the fruit supplying station a hopper is provided for depositing on the endless conveyor belt a supply of generally randomly-oriented unpitted fruit. This depositing hopper and the conveyor are designed for limiting the depth of fruit being supplied to at least approximately a single layer.

The rollers are power-rotated as they pass from juxtaposition with said fruit supplying station to juxtaposition with said fruit slicing station, so that individual fruit come to occupy respective ones of said pockets, and such fruit become oriented with their longitudinal axes at least approximately aligned transversally of said endless conveyor belt. Combs are associated with the fruit slicing knives relatively downstream of the cutting station, for freeing fruit slices from temporary enlodgement between said fruit slicing knives so that said fruit slices may be collected as an outlet stream thereof.

SUMMARY OF THE INVENTION

One of the improvements relates to the hopper which feeds the olives onto the conveyor belt. The smaller, lower base of the hopper is open, the chain of conveyor rollers forming a mobile base therefor to ensure correct loading of the conveyor belt, the side wall of the hopper corresponding to the outlet of the conveyor belt being eliminated in order to avoid obstacles for the passage of olives, and to ensure that only one layer of olives, corresponding to the foreseen load, i.e. approximately to the number of olives which are housed between each pair of adjacent rollers, remains thereon.

The height of the hopper preferably is quite low in order to reduce the weight endured by the preceding layer of olives during displacement to a minimum, thus avoiding possible damage thereto.

The rollers comprising the conveyor belt, although they maintain their basic structure of axially aligned and alternatingly arranged conic frustrum sections, are completely smooth, i.e., they lack annular necks required in the prior machine for access of the knives of the cutting means.

The rack or rolling plane is located on the upper area of the rollers, so that the olives which do not by themselves fall into the inter-roller pockets due to the rotational effect produced by the rollers are displaced towards the hopper, aided by the slope of the conveyor belt.

The improved cutting means preferably includes two knife-carrying shafts, on which are mounted a plurality of circular knives separated by spacer bushings. The said shafts are parallel to each other and the knives carried on one shaft intersect with those of the other, slightly displaced to one side, such intersection of the knives taking place in an amount being substantially greater than the size of the olives, thus ensuring complete cutting of each olive.

The edges of the knives are preferably provided with saw-like teeth, and are further more provided with some similar teeth which are larger and further apart than the others.

Spacer bushings having a knurled periphery are arranged between the knives mounted on the shaft to determine the thickness of the slices, the knurling aiding dragging thereof.

Each of the knife-carrying shafts preferably is aided by a releasing comb, the prongs whereof are inserted between each pair of circular adjacent knives, such that said combs define an outlet channel after the knurled spacer bushings which leads to the unloading vent for the olive slices.

The olives arranged on the conveying rollers contact the upper set of knives which commence the cutting process and lead the olives towards the lower set of knives, complete cutting being cooperatively effected by the two sets.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings

FIG. 3 is a larger scale partial schematic view of the machine of FIGS. 1 and 2, but showing some additional details;

FIG. 4 is a partial schematic view of the machine of FIGS. 1-3, but showing some additional details;

DETAILED DESCRIPTION

The entire disclosure of my aforementioned U.S. Pat. No. 4,646,632, issued Mar. 3, 1987 is incorporated herein by reference, and the description provided herein, apart from preliminary basics, will focus upon what is different on the improved machine, rather than providing a full description of both old and new features of the improved machine.

Figure 1:
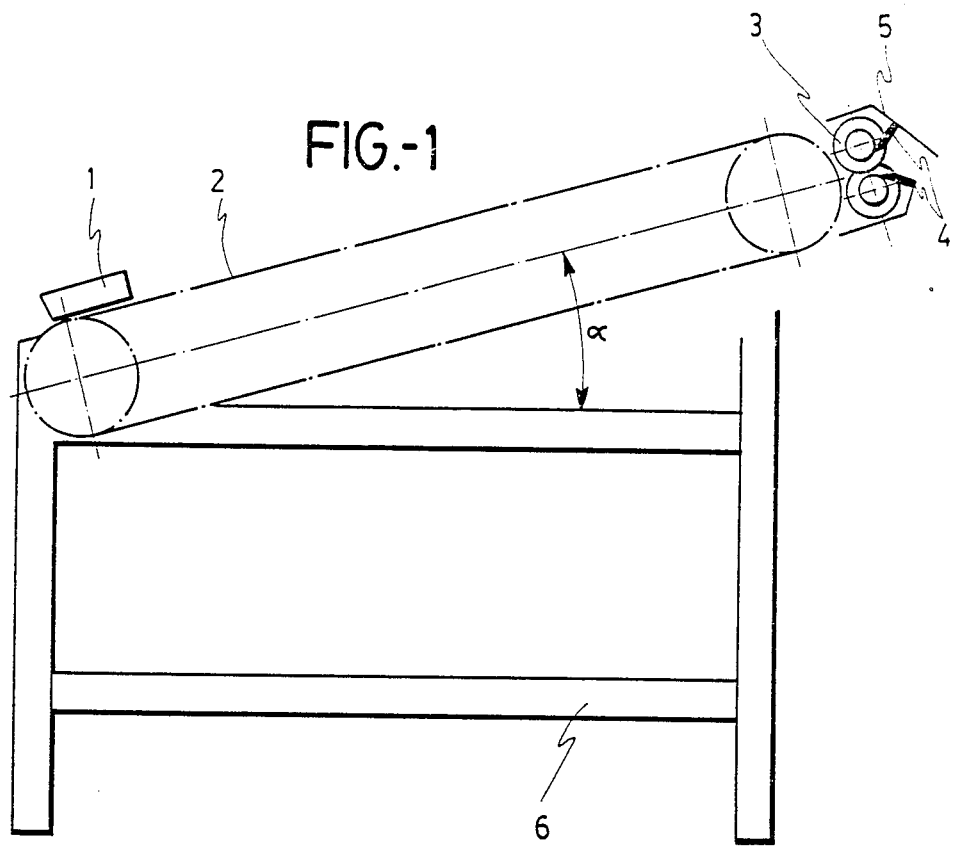
FIG. 1 is a schematic side elevational view of an improved machine for slicing olives in accordance with principles of the present invention.
Figure 2:
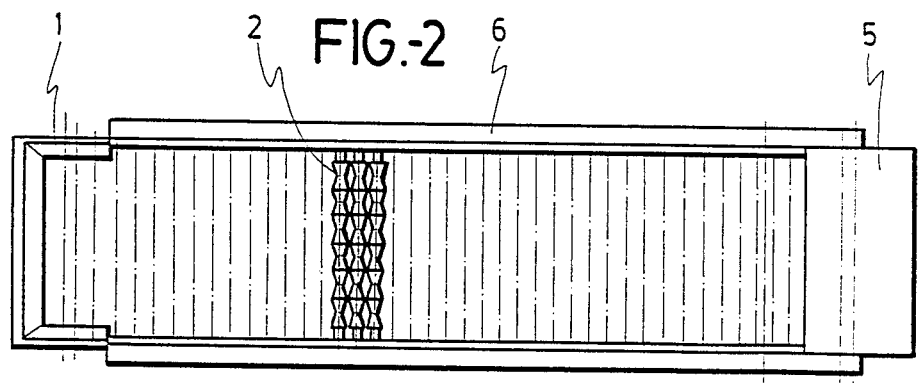
FIG. 2 is a schematic top plan view thereof.
Figures 5, 6B:
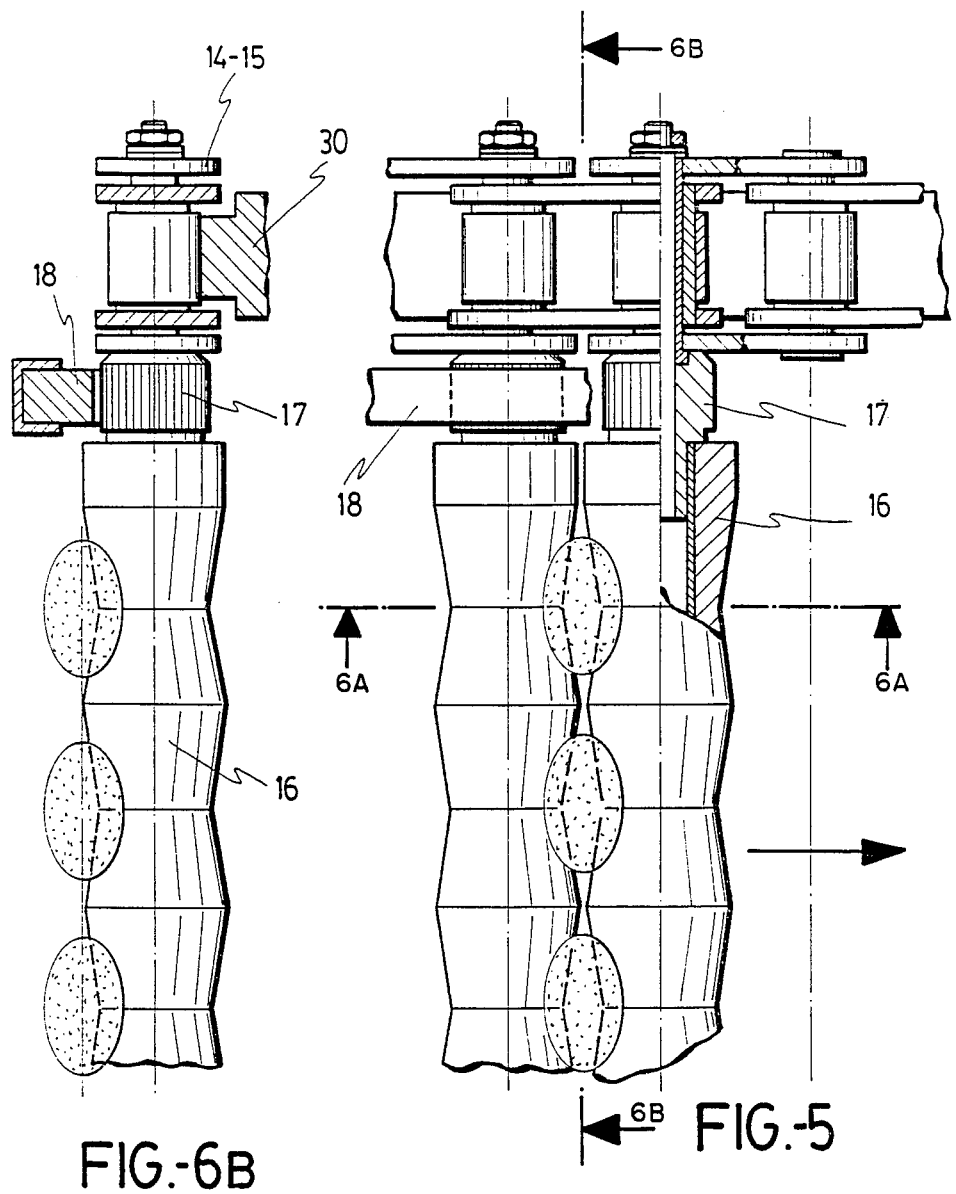
FIG. 5 is an enlarged fragmentary top plan view of the conveyor of the machine of FIGS. 1-4, with some parts broken away and sectioned to expose additional details.
FIG. 6B is a fragmentary transverse cross-sectional view of the carrying run of the conveyor taken on line B—B of FIG. 5.
Figure 6A:
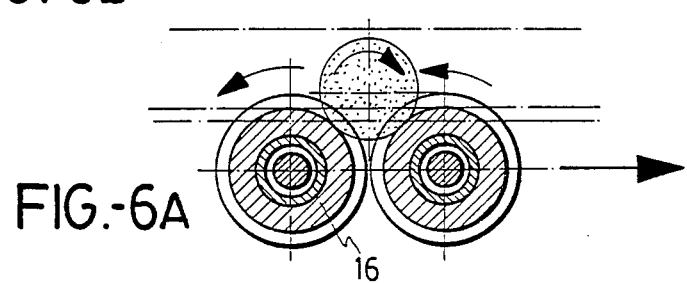
FIG. 6A is a fragmentary longitudinal sectional view of the carrying run of the conveyor taken on line A—A of FIG. 5.
Figure 7:
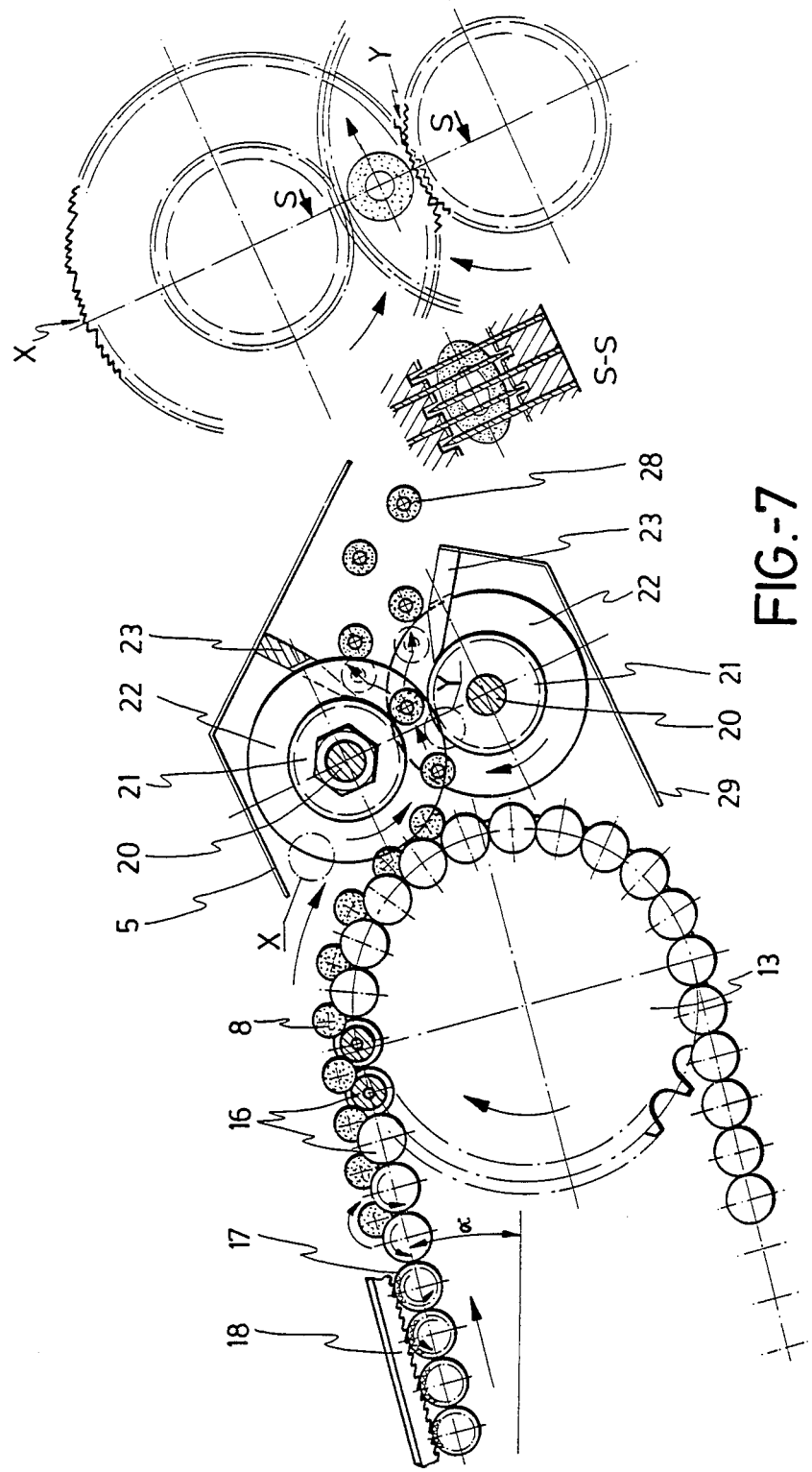
FIG. 7A is an enlarged fragmentary side elevational view of the downstream end of the carrying run of the conveyor, and the cutting station of the machine, with some parts broken away and sectioned to expose additional details.
FIG. 7B is a fragmentary transverse sectional view of a portion of the cutting station.
FIG. 7C is a larger scale partial schematic longitudinal sectional view of a portion of the cutting station.

The fruit slicing machine includes a supporting frame 6 for an endless conveyor belt 2 having an upwardly facing carrying run disposed upermost and which is inclined, by the angle from its upstream, accepting end to its downstream, delivery end so that, in the orientation depicted in FIGS. 1 and 3, the conveyor delivers to the right.

The conveyor belt 2 comprises two parallel side chains 14, 15 which are entrained about respective upstream and downstream end sprockets. The side chains run on guide surfaces 30 and between them mount a longitudinally extending series of transversally extending rotatable rollers 16, each having at each end, adjacent the respective side chain, a respective pinion 17 which, at least in a portion of the carrying run near the upstream end, is disposed in meshing engagement with a respective rack 18, so that as the sprockets 13 turn, the rollers 16 rotate in a direction opposite to the direction of advance of the carrying run of the conveyor belt.

The conveyor belt 2 is driven via the downstream sprocket 13, which is mounted on the same shaft with a pinion 11 which, in turn, is driven by a motor 9 having an output shaft on which a pinion 10 is mounted, an endless drive chain or belt 12 being drivingly entrained about the pinions 10 and 11.

The rollers 16 are of annularly-corrugated external configuration, each preferably comprising a series of alternatingly axially-oppositely oriented frusto-conical segments having smooth surfaces, so that olives which, upon being poured onto the conveyor belt near the upstream end, have not immediately settled approximately one per pocket in the transverse rows and longitudinal columns of pockets defined between the recesses of adjoining rollers 16 tend to be displaced relatively upstream by the rotation of the rollers, until they settle into unoccupied pockets.

At its upstream end, the conveyor is provided with a fruit-loading station, which includes a feed hopper 1 disposed immediately over the carrying run of the conveyor belt. The feed hopper 1 is shown constituted by an open top, open bottom upwardly-enlarging frusto-pyramidal member defined by an upstream wall and two lateral walls. The downstream side of the hopper 1 is open. By preference, the depth of the hopper is relatively small, e.g. about four olive diameters in height, and the closest distance between the bottom edge of the hopper and the rollers of the upper run of the conveyor belt is less than one-half of the diameter of an olive. Although the hopper walls could be deeper, the principle of providing a shallow hopper is that the user will be prevented from loading such a deep pile of olives into the hopper as to crush those in the lowermost layers.

At its downstream end, the conveyor is provided with a fruit cutting station 3 and a fruit unloading station 4.

Figures 8, 9:
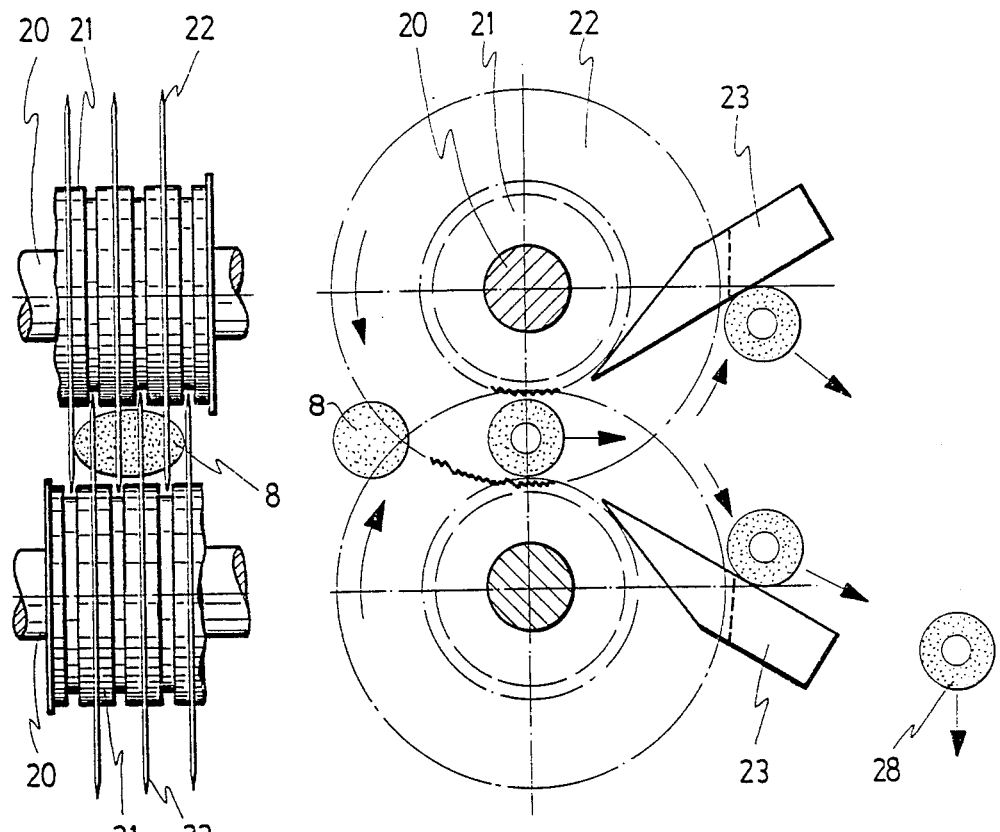
FIG. 8 is a fragmentary rear elevational view of a portion of the cutting station.
FIG. 9 is a partial schematic longitudinal sectional view of a portion of the cutting station.

The motor 9, in addition to supplying rotary power for the axles 19 of downstream toothed wheel 13, transmits rotary power to the shafts 20 of two knife-carrying drums on which are established the spacer bushings 21 for respective sets of disk-shaped knives 22. The said sets of knives are disposed to intersect as shown in FIGS. 8 and 9, being axially displaced with respect to each other, i.e. intercalated, and having a respective releasing comb interdigitated with each set on its downstream side. Transmission of rotary power to the knife-carrying drums is effected with the aid of pinions 24 mounted to the respective knife driven shafts 20, by means of a transmission chain 26 which is driven by the motor 9 through pinion 27, a tensioning roller 25 being established therebetween as illustrated in detail in FIG. 3.

The pair of knife-carrying shafts 20 are separated from conveyor belt 2 in order that the knives are slightly separated from and do not contact the rollers 16. The locations of the knives 22 with respect to the envelope of movement of the rollers 16 is such that the olives 8, on falling due to the effects of gravity, are raised and dragged towards the lower set of knives 22, cutting of the olives 8 into slices 28 being cooperatively completed by the two sets of knives.

The conveyor belt 2 suitably guides the olives 8 to the nip between the two sets of knives 22, specifically to the mouth defined by spacer bushings 21, which spacers, in addition to their separating function, lead the olives between the two sets of knives, specifically to the area where the two sets intersect, thus ensuring dragging and complete cutting of the olives into slices 28, as shown in FIGS. 8 and 9. The slices are conveyed and unloaded into the corresponding tank or collector, aided by the operator-protecting shroud 5 overhanging the knives. The lower knife protection shroud 25 serves only a operator-protecting function.

It should now be apparent that the fruit slicing machine as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A machine for slicing at least slightly oblong fruit having a minor diameter extending crosswise of an axis of elongation thereof, which fruit have no pits, such as olives from which pits have been removed, comprising:

an inclined roller-type conveyor belt having a carrying run extending between a hopper-type loading station and an interdigitated rotary knife-type of a cutting station served by a comb-type of a slice-unloading station, wherein:

the hopper-type loading station comprises an open-bottomed hopper disposed no more than one-half a minor diameter of said fruit over said roller-type loading station and being open downwards downstream so that fruit poured into said hopper may be conveyed out;

the inclined roller-type conveyor belt comprising a longitudinally extending series of transversally extending rollers, each of which is externally annularly corrugated so as to have an alternating series of bulges and recesses, the rollers being aligned so that corresponding recesses of adjacent pairs of said rollers define respective pockets arranged in a pattern of transversally extending rows and longitudinally extending columns, each said pocket being adapted to received and orient an individual fruit;

said rotary knife-type of said cutting station comprising an upper, transversally extending rotary drum carrying a first series of disk-shaped knives spaced from one another along that upper drum, and a lower, transversally extending rotary drum carrying a second series of disk-shaped knives spaced from one another along that lower drum, said first and second series of knives having opposite ends and being intercalated so that, except at opposite ends of the series, the outer periphery of each knife on one said drum lies between two knives on the other said drum and in close proximity with the drum opposite to that on which such knife is carried, said knives on one of said drums being arranged to spear fruit carried in a row of said pockets at said cutting station and unload said fruit into a knife-interdigitated nip formed between said first and second series of disk-shaped knives and said upper and lower drums; and said comb-type of slice-unloading station comprising comb means associated with each of said series of disk-shaped knives at said cutting station for combing fruit slices from between said knives on a downstream side of said cutting station.

2. The fruit slicing machine of claim 1, wherein:
said rollers are each externally corrugated by alternatingly axially-oppositely tapering smooth frustoconically shaped segments.

3. The fruit slicing machine of claim 2, further including:
meshing rack and pinion means between each roller and a support for said conveyor belt for rotating said rollers towards upstream in a segment of said conveyor belt located downstream of and adjacent to said hopper.

4. The fruit slicing machine of claim 2, wherein:
each of said drums is circumferentially grooved between each pair of adjacent said knives carried thereby, and in said nip the radially outer edge of each knife carried on each said drum is received in a corresponding said recess on the respective other said drum.

5. The fruit slicing machine of claim 4, wherein:
said radially outer edge of each said knife is serrated into a circumferentially extending series of teeth.

6. The fruit slicing machine of claim 5, wherein:
each said series of teeth comprises a set of fewer regularly-spaced larger teeth intercalated in a set of a greater number of smaller teeth so that, on each knife, between each pair of said larger teeth lie a plurality of said smaller teeth.

* * * * *